US007773681B2

(12) United States Patent
Koo et al.

(10) Patent No.: US 7,773,681 B2
(45) Date of Patent: Aug. 10, 2010

(54) METHOD AND APPARATUS FOR ESTIMATING SIGNAL-TO-NOISE RATIO, NOISE POWER, AND SIGNAL POWER

(75) Inventors: Chang-Soo Koo, Melville, NY (US); Peter J. Voltz, Commack, NY (US); I-Tai Lu, Dix Hills, NY (US); Qingyuan Dai, Germantown, MD (US); Robert L. Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 879 days.

(21) Appl. No.: 11/461,658

(22) Filed: Aug. 1, 2006

(65) Prior Publication Data

US 2007/0053452 A1 Mar. 8, 2007

Related U.S. Application Data

(60) Provisional application No. 60/705,915, filed on Aug. 5, 2005.

(51) Int. Cl.
*H04K 1/10* (2006.01)

(52) U.S. Cl. .................. 375/260; 375/227; 324/614; 348/193; 381/94.7

(58) Field of Classification Search .............. 370/206; 375/227, 267
See application file for complete search history.

(56) References Cited

U.S. PATENT DOCUMENTS

| | | | |
|---|---|---|---|
| 6,317,456 B1 | 11/2001 | Sayeed | |
| 6,456,653 B1* | 9/2002 | Sayeed | ............ 375/227 |
| 6,760,370 B2 | 7/2004 | Li et al. | |
| 6,850,500 B2 | 2/2005 | Zeira et al. | |
| 7,187,646 B2* | 3/2007 | Schramm | ............ 370/206 |
| 2002/0110138 A1 | 8/2002 | Schramm | |
| 2004/0165524 A1 | 8/2004 | Chen et al. | |
| 2006/0104380 A1* | 5/2006 | Magee et al. | ............ 375/267 |

FOREIGN PATENT DOCUMENTS

| | | |
|---|---|---|
| EP | 1176750 | 1/2002 |
| TW | 1234354 | 6/2005 |

OTHER PUBLICATIONS

IEEE Wireless LAN Edition, A Compilation Based On IEEE Std. 802.11™—1999 (R2003) and its amendments, pp. 1-678.
IEEE P802.11n™/D1.0, Draft Amendment to Standard for Information Technology-Telecommunications and Information Exchange Between Systems-Local and Metropolitan Networks-Specific Requirements-Part 11: Wireless LAN Medium Access Control (MAC) and Physical Layer (PHY) Specifications: Enhancements for Higher Throughput, Mar. 2006.
Cheon et al., "Effect of Channel Estimation Error in OFDM-Based WLAN," IEEE Communications Letters, vol. 6, No. 5, pp. 190-191 (May 2002).

* cited by examiner

*Primary Examiner*—David C Payne
*Assistant Examiner*—Adolf Dsouza
(74) *Attorney, Agent, or Firm*—Volpe & Koenig, P.C.

(57) ABSTRACT

In a wireless communication system, a method and apparatus for noise estimation of a received OFDM communication signal, wherein the signal comprises a data frame with a preamble having at least one long training field (LTF) containing two substantially similar OFDM symbols, comprise examining the LTF for substantially similar OFDM symbols. The noise power in the signal is estimated and the received signal power is measured. The signal to noise ratio is calculated and the signal power is determined by subtracting the noise power from the signal noise.

25 Claims, 7 Drawing Sheets

METHOD AND APPARATUS FOR ESTIMATING SIGNAL-TO-NOISE RATIO, NOISE POWER, AND SIGNAL POWER

CROSS REFERENCE TO RELATED APPLICATIONS

This application claims the benefit of U.S. Provisional Application No. 60/705,915, filed on Aug. 5, 2005, which is incorporated by reference herein as if fully set forth.

FIELD OF INVENTION

The present invention is related to the estimation of noise in wireless communication systems. In particular, the present invention is related to a method and apparatus for estimating signal-to-noise ratio, noise power, and signal power in a wireless communication system.

BACKGROUND

In many wireless systems, such as a system defined by the proposed 802.11n standard, data packets include preambles, or headers, that precede the data in a frame. Current IEEE 802.11a and IEEE 802.11g protocols utilize such a frame structure.

FIG. 1 shows a legacy data frame (L-Data) structure 10. The L-Data structure 10 includes preamble fields, which are also known as headers, such as a legacy short training field (L-STF) 11, a legacy long training field (L-LTF) 12, and a legacy signal field (L-SIG) 13. Each of the preamble fields in the L-Data frame structure 10 serve a specialized function within the header. For example, the L-STF field 11 is utilized for automatic gain control (AGC), while the L-LTF field 12 may be used for channel estimation and fine time/frequency offset estimation. In addition, the L-Data frame structure 10 includes a legacy data field (L-DATA) 14, which contains the transmitted data. The L-Data frame structure 10 is particularly suited to low throughput of Single-In Single-Out (SISO) data transmission. For a 20 MHz presentation protocol data unit (PPDU), the L-STF 11 and L-LTF 12 fields may be 8 microseconds in length, while the L-SIG 13 field is 4 microseconds in length.

As in nearly any communication system, however, a wireless communication system is subject to noise and interference which can distort the signal and corrupt the reception of the transmitted data. Accordingly, methods and devices for dealing with noise and interference have been employed. Some of these methods, or techniques, attempt to estimate the noise in order to eliminate it from the received signal.

One common technique for noise estimation is the maximum likelihood method. However, a drawback to this method is that the channel state information is required. Another alternative is to use a frequency domain autocorrelation function. This method is troublesome, though, if there is significant frequency variation.

It would therefore be advantageous if a method and apparatus existed that overcomes the drawbacks of prior art wireless systems.

SUMMARY

In a wireless communication system, a method and apparatus for noise estimation of a received OFDM communication signal, wherein the signal comprises a data frame with a preamble having at least one long training field (LTF) containing two substantially similar, or identical OFDM symbols, comprise examining the LTF for identical OFDM symbols. The noise power in the signal is estimated and the received signal power is measured. The signal to noise ratio is calculated and the signal power is determined by subtracting the noise power from the signal noise.

BRIEF DESCRIPTION OF THE DRAWINGS

The foregoing summary, as well as the following detailed description of the preferred embodiments of the present invention will be better understood when read with reference to the appended drawings, wherein.

DETAILED DESCRIPTION OF THE PREFERRED EMBODIMENTS

Hereafter, a wireless transmit/receive unit (WTRU) includes but is not limited to a user equipment (UE), mobile station, fixed or mobile subscriber unit, pager, base station, Node-B, site controller, access point (AP) or any other type of device capable of operating in a wireless environment.

Figure 1:
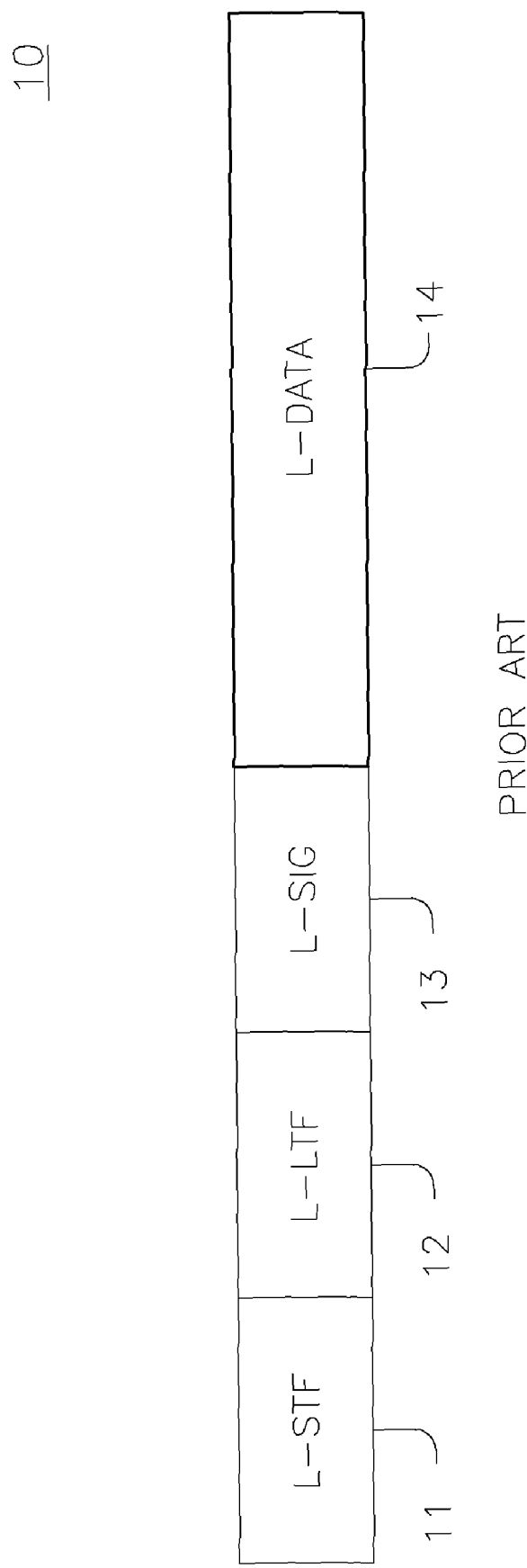
FIG. 1 shows a prior art legacy data frame (L-Data) structure.
Figure 2:
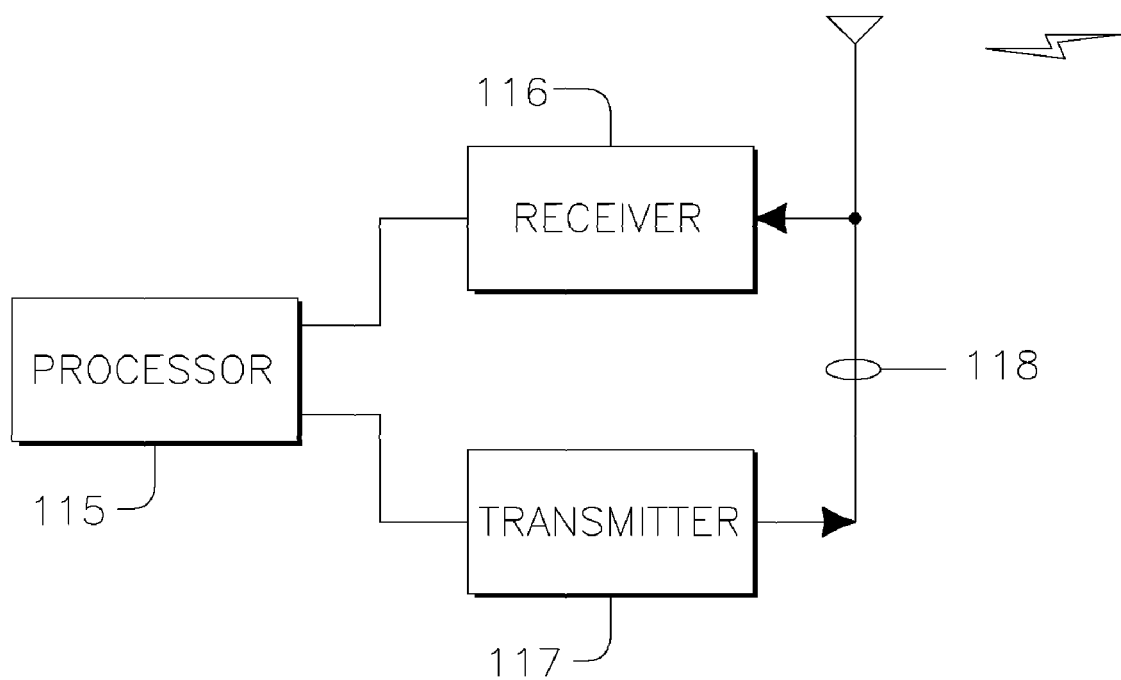
FIG. 2 is a functional block diagram of a wireless transmit/receive unit (WTRU) configured to perform a method in accordance with the present invention.

FIG. 2 is a functional block diagram of a WTRU 110 configured to perform a method of noise estimation and cancellation in accordance with the present invention. In addition to components included in a typical WTRU, the WTRU 110 includes a processor 115 configured to perform a method of noise estimation and cancellation, a receiver 116 in communication with the processor 115, a transmitter 117 in communication with the processor 115, and an antenna 118 in communication with the receiver 116 and the transmitter 117 to facilitate the transmission and reception of wireless data. Additionally, the receiver 116, transmitter 117 and antenna 118 may be a single receiver, transmitter and antenna, or may include a plurality of individual receivers, transmitters and antennas, respectively.

Figure 3:
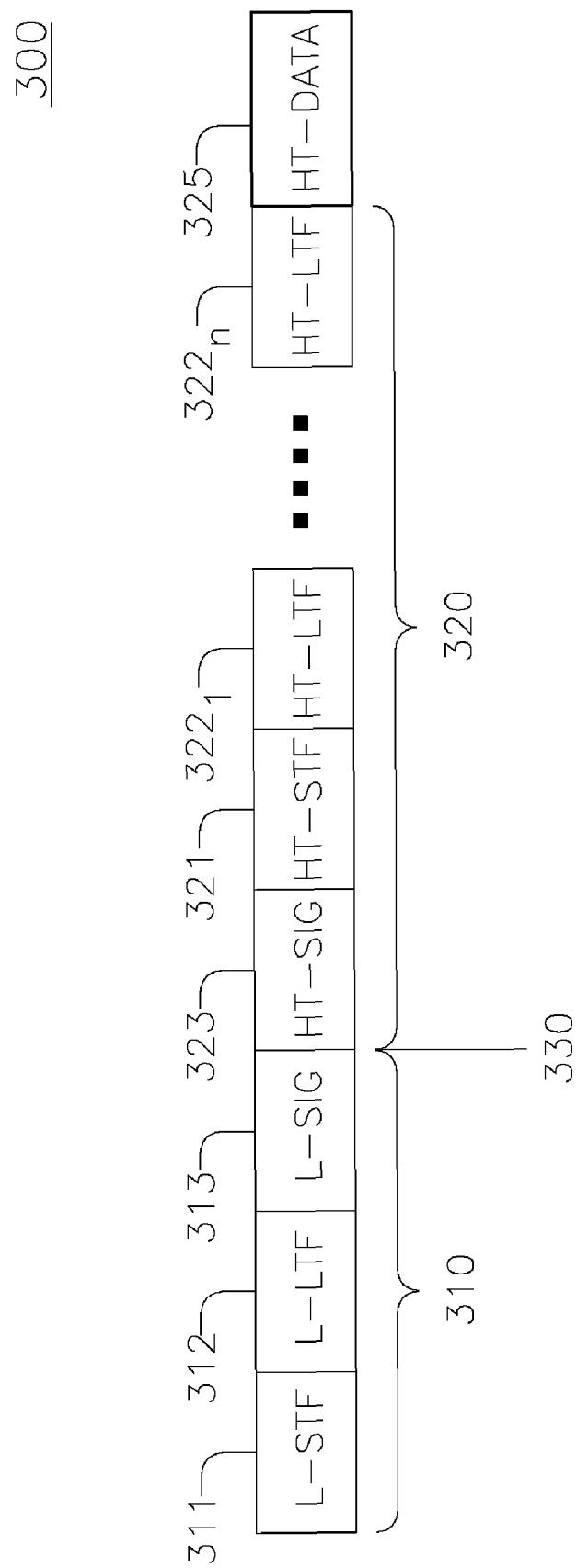
FIG. 3 shows a high throughput (HT) dataframe, in accordance with the present invention.

FIG. 3 shows a high throughput (HT) dataframe 300, in accordance with the present invention. The HT dataframe 300 includes a legacy preamble 310, an HT preamble 320, and an HT-DATA field 325. The HT dataframe 300 allows for the high throughput of multiple-in multiple-out (MIMO) data transmission.

The legacy preamble 310 includes a legacy short training field (L-STF) 311, a legacy long training field (L-LTF) 312, and a legacy signal field (L-SIG) 313. The L-STF 311, L-LTF 312, and the L-SIG 313 are substantially similar to the L-STF 11, L-LTF 12, and L-SIG 13 fields respectively of the legacy dataframe 10. The legacy preamble 310 serves the function of initial signal acquisition, or determining the start of packet detection, initial automatic gain control (AGC), and coarse frequency/time offset estimation.

The HT preamble 320 includes an HT-STF 321, an HT-SIG 323, and HT-LTFs 322 ($322_1 \ldots 322_n$). In a preferred embodiment of the present invention, the HT preamble fields are similar to their respective counterparts, L-STF 11, L-SIG 13 and L-LTF 12 in the legacy header 310. An autodetect boundary 330 exists at boundary point between the legacy preamble 310 and the HT preamble 320 in order to detect the HT PPDU at the boundary 330, which in a preferred embodiment may be a 20 MHz PPDU.

Additionally, for a 20 MHz PPDU, the L-STF 311 and L-LTF 312 may be 8 microseconds in length, and the L-SIG 313 field may be 4 microseconds in length. The HT-SIG field 323 may be 8 microseconds in length, the HT-STF 321 may be 2.4 microseconds in length, and the HT-LTFs 322 may be 7.2 microseconds in length. However, any field length may be implemented.

In an embodiment of the present invention, noise estimation is performed in the time domain, utilizing the LTFs in the HT dataframe 300 preamble. The LTFs may either be the L-LTF 312 in the legacy preamble 310 or the HT-LTFs 322 in the HT preamble 320. Typically, the number of HT-LTFs sent in a communication signal should be at least equal to the number of data streams sent, and at most, equal to the number of transmitters, or transmitting antennas.

Figure 4:
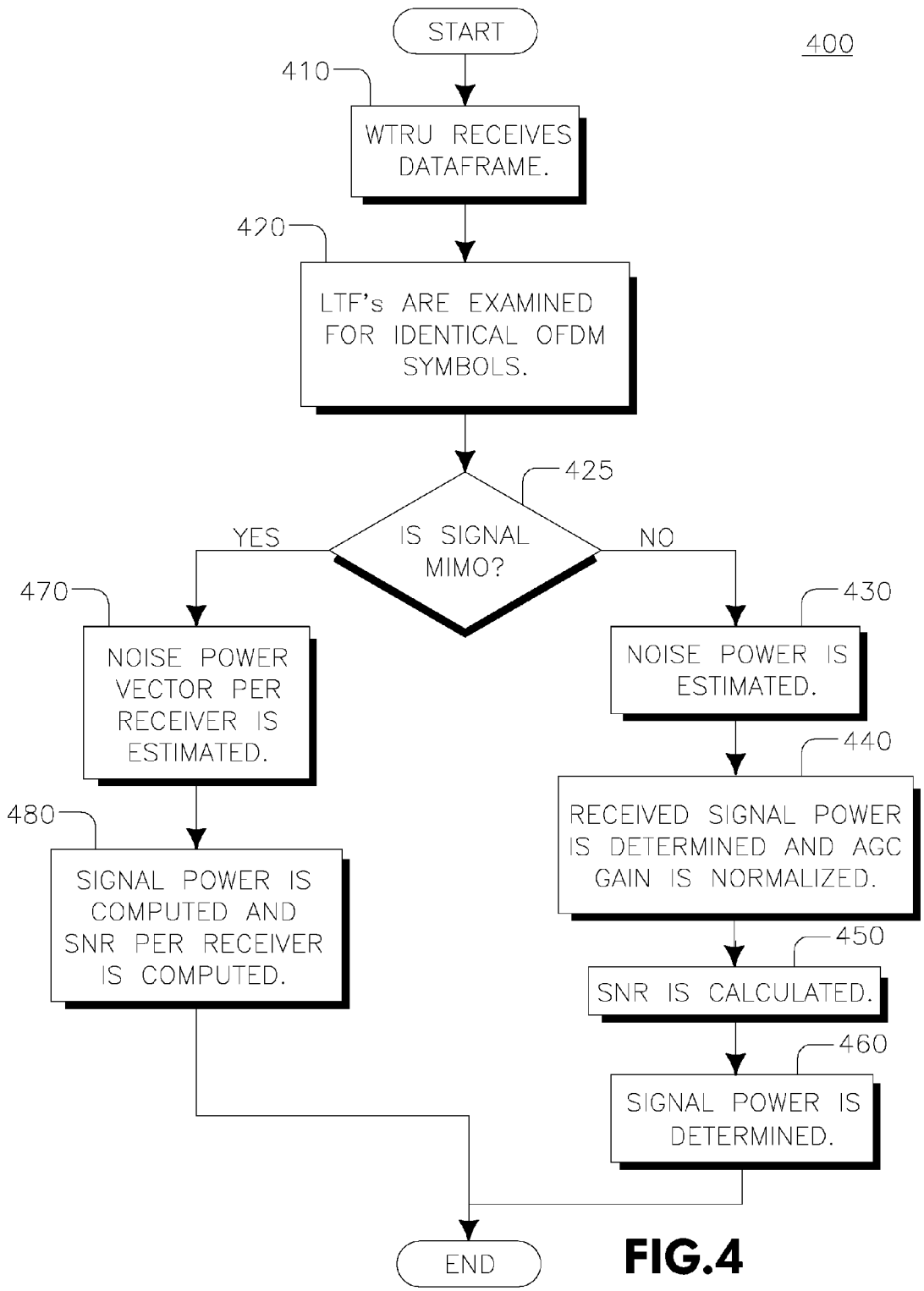
FIG. 4 is a flow diagram of a preferred method of estimating noise in accordance with the present invention

FIG. 4 is a flow diagram of a method for estimating noise 400 by the WTRU 110, in accordance with the present invention. In general, the method 400 employs noise estimation in the time domain by examining data in the LTFs, such as either 312 or 322 of the signal preamble, since two of the same OFDM symbols should be transmitted in the LTFs, (both L-LTF 312 and HT-LTF 322). This substantially similar, or identical, OFDM symbol transmission in the LTFs provides for high reliability in estimating the channel state information and the frequency/time offset for data detection.

In step 410, the receiver 116 of the WTRU 110 receives the HT dataframe 300 containing an LTF having substantially similar or identical OFDM symbols, and transfers the HT dataframe 300 to the processor 115 for processing. If the system from which the receiver 116 receives the dataframe is a low-throughput legacy SISO system, then the identical OFDM symbols will reside in the L-LTF 312. If the system is from an HT MIMO system, then the identical symbols will reside in the HT-LTF 322.

The LTFs are then examined for identical OFDM symbols (step 420). If the received signal is a SISO signal (step 425), then the method advances to step 430. If the signal is a MIMO signal (step 425), then the method advances to step 470.

Considering a SISO system, letting $r^{(1)}$ and $r^{(2)}$ represent the first and second received symbols (after removing the guard time):

$$r^{(1)}(t) = ah(t) \otimes s(t) + an_1(t), \text{ and}$$

$$r^{(2)}(t) = ah(t) \otimes s(t) + an_2(t); \quad \text{Equation (1)}$$

where s(t) is the transmitted symbol, h(t) is the time-invariant channel impulse response and a is the unknown AGC gain. In the present example, $n_1(t)$ and $n_2(t)$ represent independent noise samples. From this, the noise power is estimated by squaring the differences between the corresponding samples for the first and second received LTF signal noise as described in Equation (1) and averaging them (step 430) as described in the following equation:

$$\frac{1}{64} \sum_{t=0}^{63} |r^{(1)}(t) - r^{(2)}(t)|^2 = \frac{|a|^2}{64} \sum_{t=0}^{63} [|n_1(t)|^2 + |n_2(t)|^2 + n_1(t)n_2^*(t) + n_2(t)n_1^*(t)].$$

$$\approx \frac{|a|^2}{64} \sum_{t=0}^{63} [|n_1(t)|^2 + |n_2(t)|^2]$$

$$\approx 2|a|^2 \sigma_n^2 \quad \text{Equation (2)}$$

where $\sigma_n^2$ is the noise variance and the total number of time samples per symbol are derived from the length of one OFDM symbol in a 20 MHz system being 3.2 microseconds, such that $$\frac{3.2 \ \mu\text{sec}}{\text{symbol}} / \frac{50 \ \text{n sec}}{\text{sample}} = 64 \frac{\text{samples}}{\text{symbol}}.$$

Additionally, oversampling may be utilized to improve the estimation accuracy and performance by reducing aliasing effects.

The received signal power is calculated and $a^2$ is normalized against the received signal power (step 440) as in the following equation:

$$P_s^{(1)} = \frac{1}{64} \sum_{t=0}^{63} |ah(t) \otimes s(t)|^2 = \frac{1}{64} \sum_{t=0}^{63} |r^{(1)}(t)|^2 - a^2 \sigma_n^2. \quad \text{Equation (3)}$$

In step 450, the signal-to-noise ratio (SNR) is calculated as per the following equation:

$$SNR = \frac{\frac{1}{2}(P_s^{(1)} + P_s^{(2)})}{\sigma_n^2}. \quad \text{Equation (4)}$$

The signal power is then determined by subtracting the noise power from the squared received signal noise (step 460).

With respect to a MIMO system, the above analysis and equations are applicable for any receiving antenna, notwithstanding the number of transmitting antennas. Here, h(t) is the effective channel impulse response combining the effects of: 1) different excitation phases and time delays on different transmitting antennas; and 2) different propagation responses from different transmitting antennas to the received antennas. All 64 samples in a symbol may be used as long as the effective delay spread of the effective channel impulse response is less than the guard time interval.

Figure 5:
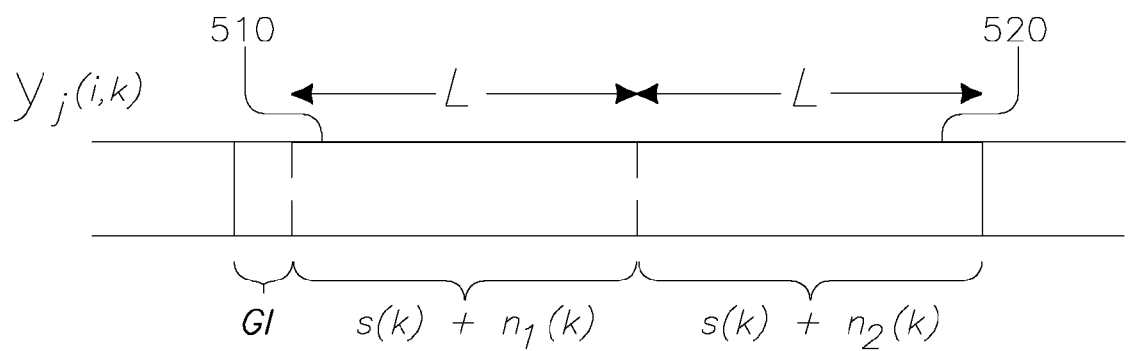
FIG. 5 shows a receive signal header LTF with common OFDM symbols.

FIG. 5 shows a receive signal header LTF 500 having common OFDM symbols. The signal header LTF 500 may be either an L-LTF 312 or an HT-LTF 322. The signal header LTF 500 as shown is a received signal $y_j(i,k)$, on a $j^{th}$ receive antenna in the time domain where i represents the index of LTFs and k represents the time sample number within an OFDM symbol of LTF. Additionally, the signal header LTF 500 includes a guard interval (GI) and is concatenated with two identical OFDM symbols s(k) in the time domain, each with independent noise samples $n_1(k)$ and $n_2(k)$ (designated 510 and 520, respectively).

Since the symbols s(k) are common, or identical, the receive signal equation for $y_j(i,k)$ can be simplified as follows:

$$y_j(i,k)-y_j(i,k+L)=n_1(k)-n_2(k). \quad \text{Equation (5)}$$

Referring back to FIG. 4, assuming the channel to be invariant during the period of two OFDM symbols, equivalent to 6.4 μs, the noise power ($N_{Rx} \times 1$) vector estimation per receiver 116 is estimated by the processor 115 in step 470 as follows:

$$\sigma_{n,j}^2 = \frac{1}{N}\sum_{i=1}^{N}\left(\frac{1}{2L}\sum_{k=0}^{L-1}|y_j(k)-y_j(k+L)|^2\right); \quad \text{Equation (6)}$$

where $y_j$ is the ($N_{Rx} \times 1$) observed signal vector and $N_{Rx}$ is the number of receivers. The indices, i and k, represent the LTF packet (two OFDM symbols) number and the time sample number of 50 ns within an OFDM symbol, such as for a 20 MHz IEEE 802.11n system. For a 40 MHz system, the sample interval would be 25 ns.

The value L represents the total number of time samples of an OFDM symbol (typically 64 for 20 MHz or 128 for 40 MHz) and N is the number of LTFs. Each LTF pulse repeats twice.

Based on the symbol used (or assigned tones) in the frequency domain, the signal power $P_{s,j}$ per receiver and the $SNR_j$ per receiver are computed (step 480) as follows:

$$P_{s,j} = \frac{1}{N}\sum_{i=1}^{N}\left(\frac{1}{2L}\sum_{k=0}^{2L-1}|y_j(k)|^2\right) - \sigma_{n,j}^2; \text{ and} \quad \text{Equation (7)}$$

$$SNR_j = \frac{P_{s,j}}{\sigma_{n,j}^2}. \quad \text{Equation (8)}$$

The above algorithm can be applied to any system which transmits more than two identical pulses where the channel is invariant for the period of pulses.

Figure 6:
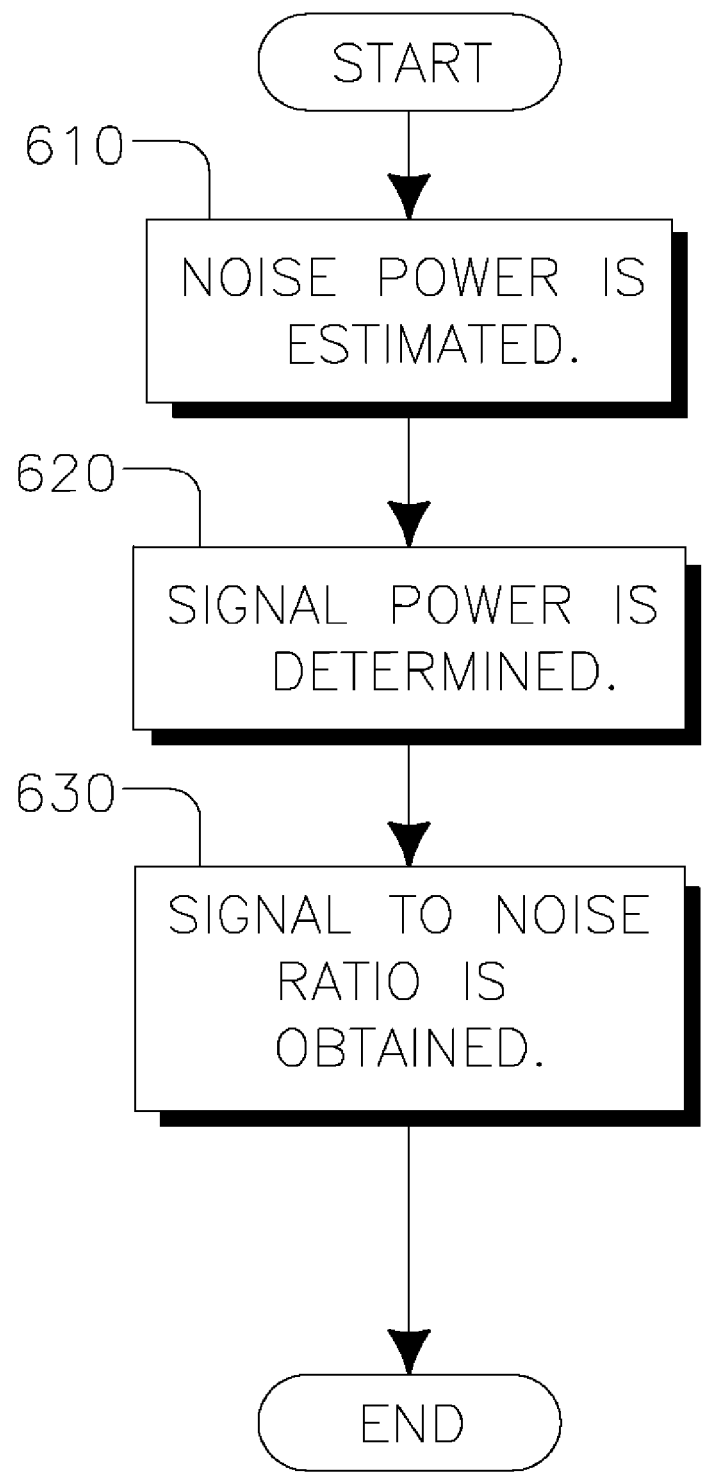
FIG. 6 is a flow diagram of an alternative method of estimating noise in accordance with the present invention.

FIG. 6 is a flow diagram of an alternative method 600 of estimating noise in accordance with the present invention. This embodiment exploits inactive tones in the frequency domain characteristic of STFs in the signal preamble. For example, in an IEEE 802.11n system, more than one half of the HT-STF 321 and L-STF 311 tones are inactive. That is to say, they are assigned to zero value. Accordingly, the inactive or unused tones will only possess noise in the frequency domain.

Accordingly, the WTRU 110 may estimate the noise power (step 610) by averaging the power of the inactive tones:

$$\sigma_{n,j}^2 = \frac{1}{L_{it}}\sum_{k=0}^{L_{it}-1}|y_j(k)|^2; \quad \text{Equation (9)}$$

where $L_{it}$ is the total number of inactive tones in the STF. The signal power is then determined by computation (step 620) in the time domain as follows:

$$P_{s,j} = \left(\frac{1}{L}\sum_{k=0}^{L-1}|y_j(k)|^2\right) - \sigma_{n,j}^2; \quad \text{Equation (10)}$$

where L=12 for legacy SISO data and L=(24 for 20 MHz, 48 for 40 MHz)/Nt for high-throughput MIMO data.

The SNR is then computed (step 630) in accordance with the following equation:

$$SNR_j = \frac{P_{s,j}}{\sigma_{n,j}^2}. \quad \text{Equation (11)}$$

Figure 7:
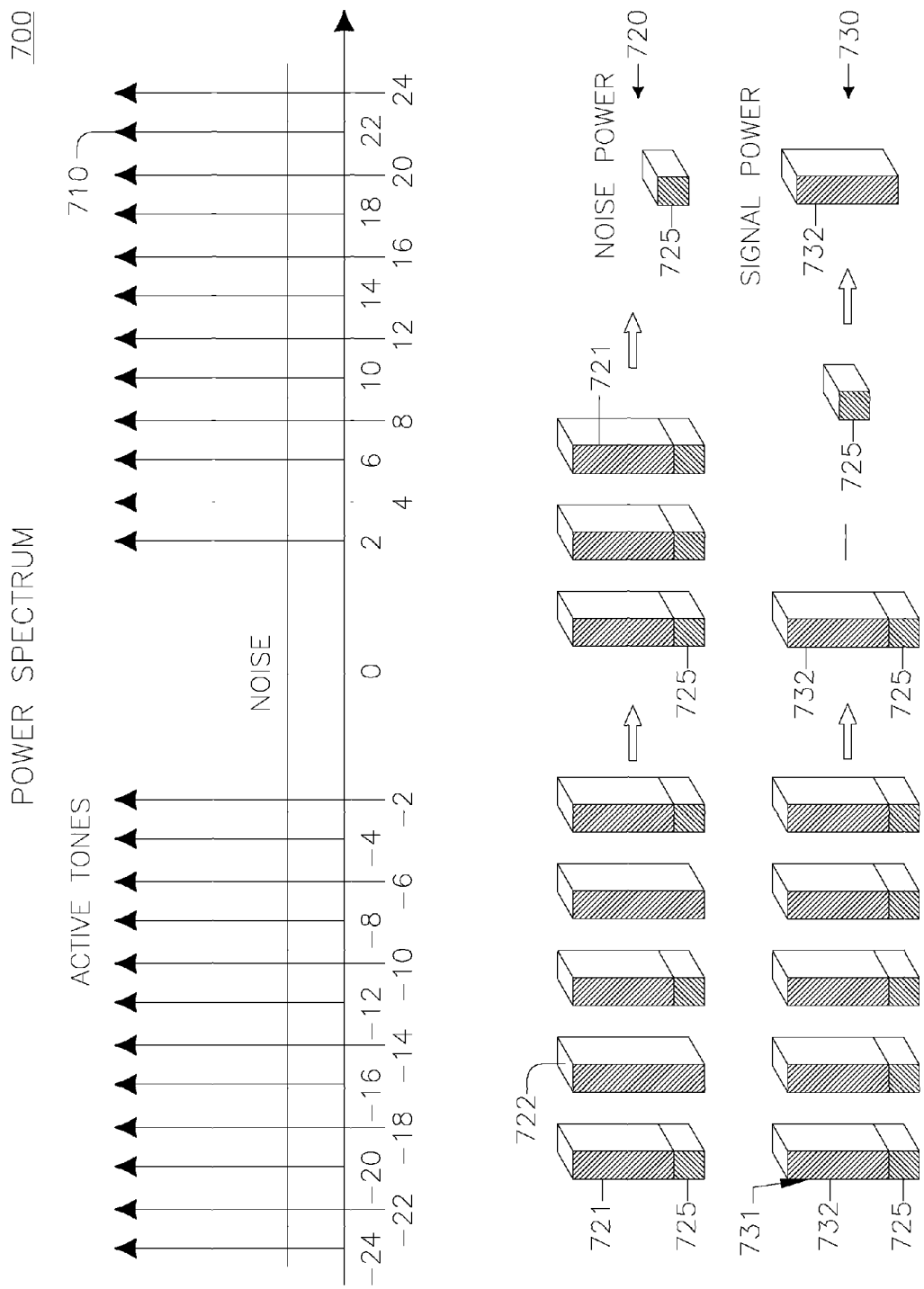
FIG. 7 is a graphical representation of noise power estimation, in accordance with an embodiment of the present invention.

FIG. 7 is a graphical representation of noise power estimation based on STFs 700, in accordance with the method 600. The graph 700 includes a power spectrum chart 710 including active and inactive tones, as well as a noise level.

A frequency domain bar chart 720 is a graph of the noise power by singling out inactive tones 721 having a noise component 725 from active tones 722. The noise power 725 can then be measured in the frequency domain from the inactive tones 721.

A time domain bar chart 730 includes a signal 731 that has a signal power portion 731 and the noise power portion 725. The signal power portion 731 is determined by subtracting the noise power portion 725 from the signal 731 to determine the resultant signal power 732.

These approaches may be used alone or in combination depending on the accuracy achieved for a particular implementation, and may be performed on each receiver 116 in the WTRU 110. Additionally, the processor 115 of the WTRU 110 may be configured to perform the steps of the methods 400 and 600 described above. The processor 115 may also utilize the receiver 116, transmitter 117, and antenna 118 to facilitate wirelessly receiving and transmitting data.

Although the noise estimations, channel estimations and SNR estimations are described above in reference to IEEE 802.11n applications, these methods may be applied to compatible IEEE 802.11a and IEEE 802.11g devices as well as any other IEEE 802, or other type of wireless system, including but not limited to WLAN access points and stations, base stations, mobile stations and WTRUs.

The features of the present invention may be implemented in a variety of manners, such as in an application running on a WTRU. The features may also be incorporated into an integrated circuit (IC) or be configured in a circuit comprising a multitude of interconnecting components. Additionally, the features may be performed by a software application that runs on an IC, or by a software application that runs on a processor.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for noise estimation of a received OFDM communication signal, comprising:
   receiving by a wireless transmit/receive unit (WTRU) a signal having a data frame with a preamble having at least one long training field (LTF) containing two substantially similar OFDM symbols and independent signal noise samples; examining by the WTRU the at least one LTF for substantially similar OFDM symbols;

estimating by the WTRU the noise power in the signal based on the substantially similar OFDM symbols, wherein the estimating includes squaring differences between the independent signal noise samples and averaging them, and wherein the estimating is performed in accordance with the following equation:

$$\frac{1}{64}\sum_{t=0}^{63} |r^{(1)}(t) - r^{(2)}(t)|^2 = \frac{|a|^2}{64}\sum_{t=0}^{63} [|n_1(t)|^2 + |n_2(t)|^2 + n_1(t)n_2^*(t) + n_2(t)n_1^*(t)]$$

$$\approx \frac{|a|^2}{64}\sum_{t=0}^{63} [|n_1(t)|^2 + |n_2(t)|^2]$$

$$\approx 2|a|^2 \sigma_n^2$$

where $r^{(1)}(t)$ represents the first received symbol, $r^{(2)}(t)$ represents the second received symbol, a represents the automatic gain control (AGC) gain, $n_1(t)$ and $n_2(t)$ represent independent noise samples, and $\sigma_n^2$ is the noise variance;

determining by the WTRU the received signal power;

calculating by the WTRU the signal to noise ratio to determine signal noise; and determining by the WTRU the signal power by subtracting the noise power from the received signal noise.

2. The method of claim 1 wherein the total number of time samples per symbol is derived from the length of one OFDM symbol.

3. The method of claim 2 wherein the length of the OFDM symbol is 3.2 microseconds.

4. The method of claim 1, further comprising oversampling the signal.

5. The method of claim 1, further comprising normalizing AGC against the received signal power.

6. The method of claim 1 wherein determining the signal power includes subtracting the noise power from the square of the received signal noise.

7. The method of claim 1, further comprising removing a guard time from the received symbols.

8. A method for noise estimation of a received OFDM communication signal, comprising:

receiving by a wireless transmit/receive unit (WTRU) a signal having a data frame with a preamble having at least one long training field (LTF) containing two substantially similar OFDM symbols;

estimating by the WTRU a noise power vector per receiver based on the substantially similar OFDM symbols, wherein the estimating is performed in accordance with the following equation:

$$\sigma_{n,j}^2 = \frac{1}{N}\sum_{i=1}^{N}\left(\frac{1}{2L}\sum_{k=0}^{L-1} |y_j(k) - y_j(k+L)|^2\right)$$

where $y_j$ is the ($N_{Rx} \times 1$) observed signal vector and $N_{Rx}$ is the number of receivers;

computing by the WTRU a signal power per receiver; and computing by the WTRU the signal to noise ratio (SNR) per receiver.

9. The method of claim 8 wherein the computing the signal power per receiver includes subtracting the noise power vector from the received signal.

10. A method for noise estimation of a received OFDM communication signal, comprising:

receiving by a wireless transmit/receive unit (WTRU) a data frame in the signal, the data frame with a preamble having a plurality of long training fields (LTFs) containing two substantially similar OFDM symbols, independent signal noise samples, and a plurality of short training fields (STFs), the signal having inactive tones, the method comprising:

estimating by the WTRU the noise power per receiver based on inactive tones, wherein the estimating is performed in accordance with the following equation:

$$\sigma_{n,j}^2 = \frac{1}{L_{it}}\sum_{k=0}^{L_{it}-1} |y_j(k)|^2$$

where $L_{it}$ is the total number of inactive tones in the STF;

determining by the WTRU the received signal power; and determining by the WTRU the signal power by subtracting the noise power from the received signal power.

11. The method of claim 10 wherein estimating the noise power per receiver includes averaging the power of the inactive tones.

12. The method of claim 10 wherein the estimating the noise power per receiver includes locating a particular STF and averaging the signal power of the inactive tones within the located short training field to produce a noise power estimation.

13. The method of claim 10 wherein estimating the noise power per receiver is estimated in the frequency domain.

14. The method of claim 10 wherein determining the signal power is determined in the time domain.

15. The method of claim 10, further comprising calculating the signal to noise ratio (SNR).

16. A wireless transmit/receive unit (WTRU) configured to perform of noise estimation in a wireless communication system, the WTRU comprising:

a first receiver;

a transmitter;

a processor, operatively coupled to the receiver and the transmitter, wherein the processor is configured to receive a OFDM communication signal having a data frame with a preamble having at least one long training field (LTF) containing two substantially similar OFDM symbols and independent signal noise samples from the first receiver, examine the at least one LTF for substantially similar OFDM symbols, estimate the noise power in the signal based on the substantially similar OFDM symbols, wherein the estimating includes squaring differences between the independent signal noise samples and averaging them, and wherein the estimating is performed in accordance with the following equation:

$$\frac{1}{64}\sum_{t=0}^{63}\frac{1}{|r^{(1)}(t)-r^{(2)}(t)|^2} = \frac{|a|^2}{64}\sum_{t=0}^{63}$$

$$[|n_1(t)|^2+|n_2(t)|^2+n_1(t)n_2^*(t)+n_2(t)n_1^*(t)]$$

$$\approx \frac{|a|^2}{64}\sum_{t=0}^{63}[|n_1(t)|^2+|n_2(t)|^2]$$

$$\approx 2|a|^2\sigma_n^2$$

where $r^{(1)}(t)$ represents the first received symbol, $r^{(2)}(t)$ represents the second received symbol, a represents the automatic gain control (AGC) gain, $n_1(t)$ and $n_2(t)$ represent independent noise samples, and $\sigma_n^2$ is the noise variance, determine the received signal power, calculate the signal to noise ratio to determine signal noise, and determine the signal power by subtracting the noise power from the received signal noise.

17. The WTRU of claim 16 wherein the processor is further configured to square the differences between the independent signal noise samples and average them.

18. The WTRU of claim 16, further comprising a plurality of receivers.

19. The WTRU of claim 18 wherein the processor is further configured to receive a plurality of OFDM communication signals from the plurality of receivers, estimate a noise power vector per receiver, compute a signal power per receiver, and compute the signal to noise ratio (SNR) per receiver.

20. The WTRU of claim 19 wherein the plurality of OFDM communication signals include a data frame with a preamble having a plurality of long training fields (LTFs) containing two substantially similar OFDM symbols and independent signal noise samples and a plurality of short training fields (STFs) in inactive tones, and
   wherein the processor is further configured to estimate the noise power per receiver based on inactive tones, determine the received signal power, and determine the signal power by subtracting the noise power from the received signal power.

21. An integrated circuit (IC) configured to perform noise estimation in a wireless transmit/receive unit, the IC comprising:
   a first receiver;
   a transmitter;
   a processor, operatively coupled to the receiver and the transmitter, wherein the processor is configured to receive a OFDM communication signal, having a data frame with a preamble having at least one long training field (LTF) containing two substantially similar OFDM symbols and independent signal noise samples from the first receiver, examine the at least one LTF for substantially similar OFDM symbols, estimate the noise power in the signal based on the substantially similar OFDM symbols, wherein the estimating includes squaring differences between the independent signal noise samples and averaging them, and wherein the estimating is performed in accordance with the following equation:

$$\frac{1}{64}\sum_{t=0}^{63}\frac{1}{|r^{(1)}(t)-r^{(2)}(t)|^2} = \frac{|a|^2}{64}\sum_{t=0}^{63}$$

$$[|n_1(t)|^2+|n_2(t)|^2+n_1(t)n_2^*(t)+n_2(t)n_1^*(t)]$$

$$\approx \frac{|a|^2}{64}\sum_{t=0}^{63}[|n_1(t)|^2+|n_2(t)|^2]$$

$$\approx 2|a|^2\sigma_n^2$$

where $r^{(1)}(t)$ represents the first received symbol, $r^{(2)}(t)$ represents the second received symbol, a represents the automatic gain control (AGC) gain, $n_1(t)$ and $n_2(t)$ represent independent noise samples, and $\sigma_n^2$ is the noise variance, determine the received signal power, calculate the signal to noise ratio to determine signal noise, and determine the signal power by subtracting the noise power from the received signal noise.

22. The IC of claim 21 wherein the processor is further configured to square the differences between the independent signal noise samples and average them.

23. The IC of claim 21, further comprising a plurality of receivers.

24. The IC of claim 23 wherein the processor is further configured to receive a plurality of OFDM communication signals from the plurality of receivers, estimate a noise power vector per receiver, compute a signal power per receiver, and compute the signal to noise ratio (SNR) per receiver.

25. The IC of claim 24 wherein the plurality of OFDM communication signals include a data frame with a preamble having a plurality of long training fields (LTFs) containing two substantially similar OFDM symbols and independent signal noise samples and a plurality of short training fields (STFs) in inactive tones, and
   wherein the processor is further configured to estimate the noise power per receiver based on inactive tones, determine the received signal power, and determine the signal power by subtracting the noise power from the received signal power.

* * * * *